T862008

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 23

748,659

POLYCARBODIIMIDES FOR IMPROVING AGING RESISTANCE OF POLYESTER FIBER IN SULFUR-CURED RUBBER VULCANIZATES

Henry J. Leibu, New Castle, Del., assignor to E. I. du Pont de Nemours and Company, Wilmington, Del., a corporation of Delaware

Filed July 30, 1968. Published May 6, 1969
Int. Cl. B32b *25/02;* C08g *51/60;* C08d *13/28*
U.S. Cl. 260—873
No Drawing. 30 Pages Specification

Polyester fiber (yarn, cord, or fabric) in sulfur cured rubber articles (e.g., V-belts, hose, tires) is stabilized against degradation associated with certain vulcanization accelerators (thiuram sulfides, dithiocarbamates, and certain sulfenamides), by conducting the curing in the presence of 0.5–8 parts, preferably 2–5 parts, of a polycarbodiimide or mixtures thereof (per 100 parts of the rubber).

Aromatic polycarbodiimides are preferred, especially when urethane or monocarbodiimide-terminated; a representative one, made from toluene, 2,4- and 2,6-diisocyanate (80/20 mixture), has a molecular weight of 800. Aliphatic, cycloaliphatic, and aromatic-aliphatic polycarbodiimides are also useful.

The deleterious sulfenamides have the formula G–X, where G is 2-thiazolin-2-ylthio- or 2-benzothiazolylthio- and X is

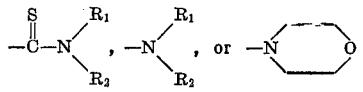

(optionally alkyl substituted) where $R_1$ and $R_2$ can be alkyl or cycloalkyl; $R_2$ can also be hydrogen; preferably $R_1$ and $R_2$ are $C_1$–$C_6$ alkyl.

Any sulfur curable rubber can be employed. Ethylene/propylene/non-conjugated diene copolymers (EPDM) are particularly important; other rubbers include natural rubber, synthetic polyisoprene, polybutadiene, and isobutylene-isoprene and styrene-butadiene rubber.

Conventional compounding and shaping methods and conventional rubber addends can be used.